United States Patent [19]
Kraus

[11] Patent Number: 5,658,110
[45] Date of Patent: Aug. 19, 1997

[54] FASTENING ELEMENT MADE OF PLASTIC

[75] Inventor: Willibald Kraus, Grunstadt, Germany

[73] Assignee: TRW Inc., Cleveland, Ohio

[21] Appl. No.: 591,340

[22] Filed: Jan. 25, 1996

[30] Foreign Application Priority Data

Feb. 8, 1995 [DE] Germany .................. 195 04 113.5

[51] Int. Cl.$^6$ ............................................. F16B 13/02
[52] U.S. Cl. ........................... 411/510; 411/508; 411/509; 411/908
[58] Field of Search ...................... 411/508, 510, 411/509, 908

[56] References Cited

U.S. PATENT DOCUMENTS

| | | | |
|---|---|---|---|
| 3,177,540 | 4/1965 | Hall et al. | 411/508 |
| 4,489,465 | 12/1984 | Lemkin . | |
| 4,668,145 | 5/1987 | Hirohata | 411/508 |
| 4,739,543 | 4/1988 | Harris, Jr. | 411/508 |
| 4,938,645 | 7/1990 | Wollar | 411/508 |
| 5,017,151 | 5/1991 | Peterson . | |
| 5,037,326 | 8/1991 | Reedy . | |
| 5,046,223 | 9/1991 | Kraus | 411/508 |
| 5,454,479 | 10/1995 | Kraus . | |

FOREIGN PATENT DOCUMENTS

| | | |
|---|---|---|
| 1357504 | 5/1963 | France . |
| 4242154 | 6/1994 | Germany . |
| 2006318 | 5/1979 | United Kingdom . |

*Primary Examiner*—Rodney M. Lindsey
*Assistant Examiner*—Fredrick Conley
*Attorney, Agent, or Firm*—Fay, Sharpe, Beall, Fagan, Minnich & McKee

[57] ABSTRACT

A plastic fastening element includes an insert portion 2 attachable in an aperture of a support. The insert portion has elastic wings 4 joined about the circumference of a rigid core 9 to extend in an axial direction relative to the support aperture. The wings 4 are designed in the shape of a triangle with the first triangle side 7 connected to core 9 of the insert piece 2, and the opposite outer triangle corner 8 defining the outer limit of a second and third triangle side 5 and 6 each of which extend from the triangle corner 8 to the core 9 of the insert piece 2. The second triangle side of each wing 4 ascends from the lower end of the core in spirally-wound form up to the respective triangle corner 8 and the third triangle side 6 of each wing 4 ascends in spirally-wound form from the respective triangle corner 8 to the core 9 of the insert portion 2.

10 Claims, 2 Drawing Sheets

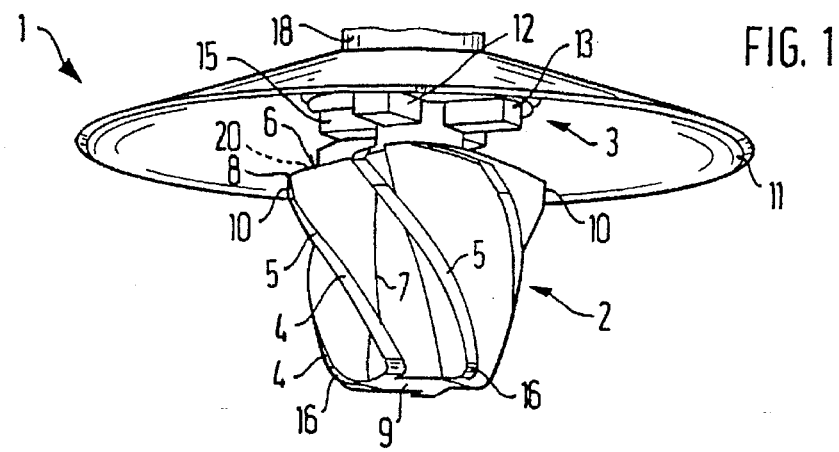
FIG. 1
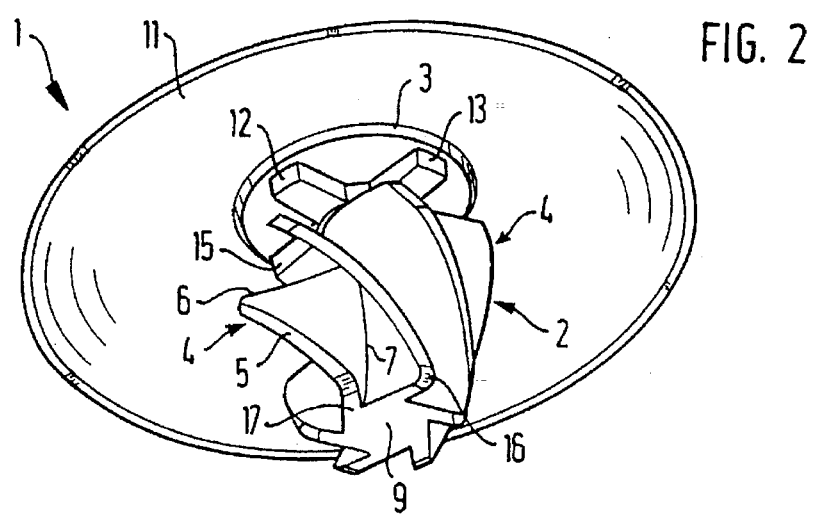
FIG. 2
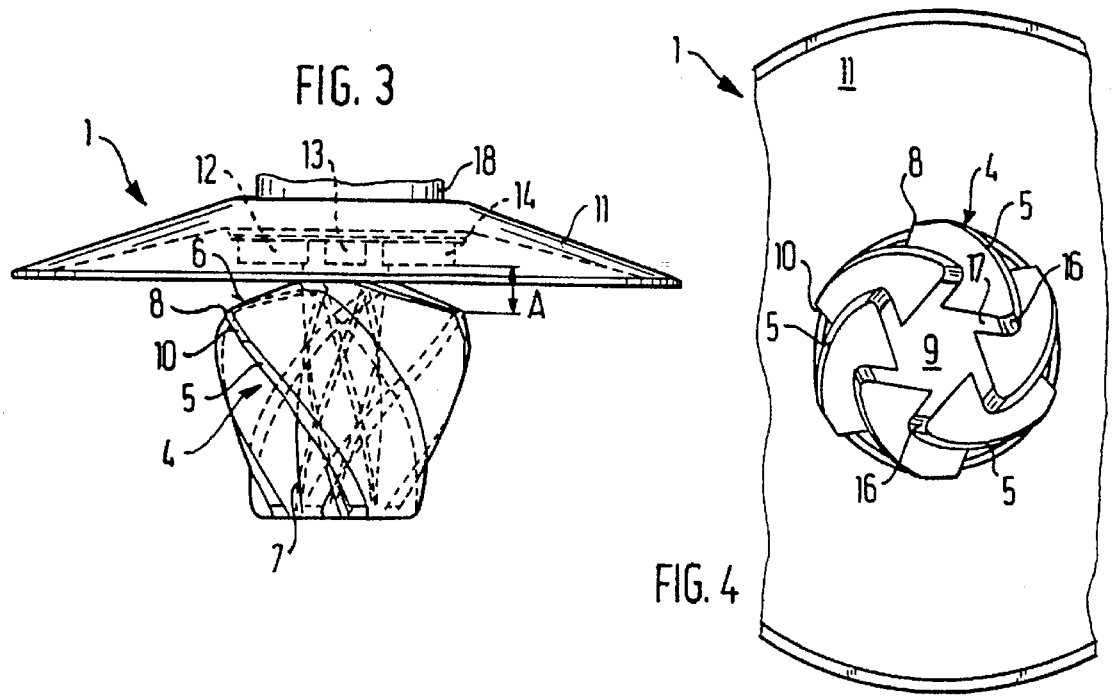
FIG. 3
FIG. 4

# FASTENING ELEMENT MADE OF PLASTIC

BACKGROUND OF THE INVENTION

The subject invention relates to a plastic fastening element having an insert portion for attachment in an aperture of a support. Distributed over the outer circumference of the insert portion are elastic triangular wings that extend generally in the axial direction of the support aperture. A first side of each triangular wing is connected with a core of the insert portion with the opposite corner of the triangle defining the outer limit of the second and a third sides of the triangle that extend between the opposite corner and the core of the insert piece. A cap piece is connected with the upper region of the insert portion and functions to cover the support aperture.

A similar fastening element is known in the prior art (U.S. Pat. No. 5,454,479 corresponding to German PS 42 42 154) which is specifically designed as a cover lid. Such a cover lid serves, for example, for closing a collar hole in the body of a motor vehicle and has a generally dish-shaped top part. This prior fastening element includes a cylindrical jacket-shaped wall carrying wings designed as engagement elements. The wings extend over at least part of the exterior surface of the wall at an acute angle relative to the radial lines of the wall. The closing lid is retained within the collar hole with the aid of the wings.

Among the further state of the art, there is also a mounting attachment for a lamp holder (U.S. Pat. No. 5,037,326). The mounting has a cylindrically shaped wall with engagement elements in the form of obliquely arranged wings on the outer circumference of the wall. In this device, the wings have the function of holding the lamp holder within a cylindrical bore in that the outer surfaces of the wings are pressed against the inner circumference of the bore. Tolerance compensation with this known construction is not intended.

In contrast to the prior art discussed above, the object of the present invention, based on the initially described fastening element, comprises further refining the construction in such manner that with slight press-in force there is guaranteed improved mounting tolerance with respect to sheet metal thickness and the diameter of the support aperture.

The above task is solved according to the invention in that the second or lowermost triangle side of each wing descends from the radial outer corner of the respective wing in a spirally wound relationship relative to the core of the insert piece. Likewise, the third side of the wing ascends in a spirally wound relationship from the same outer corner to the core of the insert piece. Due to the special spiral shape of the wings, there is a resulting benefit allowing the fastening element to be simply pressed in simple fashion into an aperture of a support and embedded therein. Because of the special spiral design of the wings, different bores and sheet metal thicknesses can be covered with a single fastener size, so that inventory keeping is beneficially reduced.

By way of further refinement of the invention, there can be a space between the third side of the triangular wings and the underside of the cover piece, which space becomes smaller toward the core of the insert piece. As a result thereof, it is possible that, for example, greater sheet metal thicknesses of the support can be received between the top of the wing and the underside of the cover piece. This results in an expansion of the useful application range.

According to another feature of the invention, the cover piece can be equipped with a circumferential sealing lip which is inclined towards the insert portion. Also, the underside of the cover piece can have at least two radial cross-pieces that extend up to the core of the insert portion.

In addition, the wings can each have a chamfered or sloping portion at the lower end region, so that there will be improved functioning during installation. Inasmuch as the wings also have a sloping portion in the area of the third triangle side, this likewise affords a beneficial disassembly possibility.

According to a more limited aspect of the invention, a total of six wings may be arranged at the outer circumference of the core of the insert portion. Additionally, there is the possibility that there is a mounting and/or fastening area above the cover piece, so that due to the special design there will result a wide application range for the fastening element.

The invention is described in more detail, based on an exemplary embodiment represented in the drawing.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

The drawing represents the following:

FIGS. 1 and 2 are each a perspective view of the fastening element according to the invention, in part from the side and in part obliquely from below;

FIG. 3 is a lateral view of the fastening element of FIGS. 1 and 2;

FIG. 4 is a bottom view of the fastening element of FIGS. 1 and 2; and,

DETAILED DESCRIPTION OF THE PREFERRED EMBODIMENT

Figure 5:
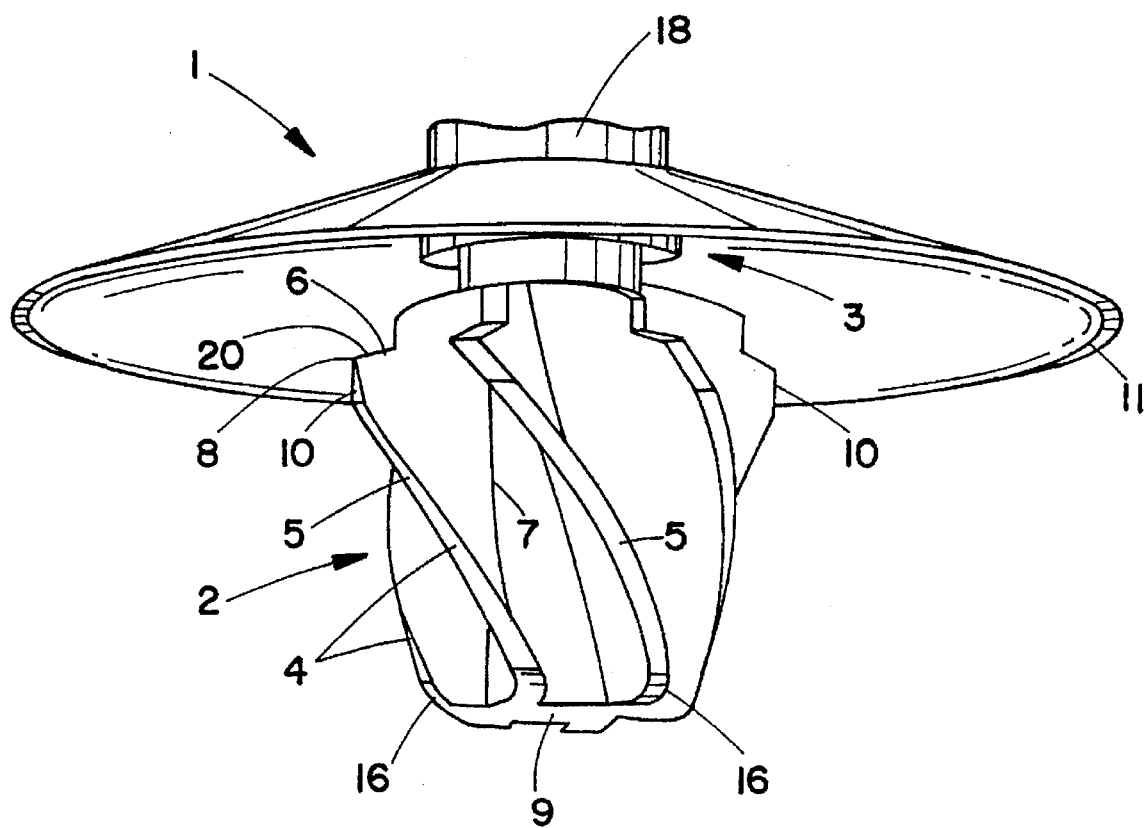
FIG. 5 is a view similar to FIG. 1 but showing a modified form of the invention.

Referring now to the drawings wherein the showings are for the purpose of illustrating the preferred embodiment of the invention only and not for purpose of limiting same, FIGS. 1–4 show the fastening element 1 as made of a suitable plastic and basically comprised of an insert portion 2 and a cover piece 3. The insert portion 2 is intended for being inserted into the aperture of a support such as a sheet metal panel which is not shown. Preferably, the insert portion 2 has a relatively rigid central core 9 with elastic wings 4 distributed over the outer circumference and extending in a generally axial direction relative to the outer circumference of the support aperture.

The wings 4 are shaped like triangles, with an outer triangle corner or tip 8 and a first triangle side 7, a second triangle side 5 and a third triangle side 6. The triangle side 7 in this arrangement is connected via a spirally-shaped course with the core 9 of the insert portion 2, whereby the opposite triangle corner or tip 8, on the one hand, and the third triangle side 6, on the other hand, passes over into the second triangle side 5.

The second triangle side 5 of the wing 4 ascends in this arrangement according to the invention from the core 9 to the triangle tip 8 in a spirally wound manner. The third triangle side 6 of wing 4 ascends from the triangle tip 8 to the core 9 of the insert portion 2 in a spirally wound manner.

It is clear from FIGS. 1 and 3 that the triangle tip 8 of each wing passes over into a transition edge 10, which is adjacent to the third triangle side 5. It is apparent from FIG. 3 that there is a space A between the second triangle side 6 and the underside of cover piece 3, which decreases in thickness from the tip 8 up to the core 9 of the insertion portion 2.

As shown in FIGS. 1 and 2, the underside of cover piece 3 can have several cross-pieces extending radially up to core 9 of insert portion 2. In the subject embodiment, four radial cross-pieces 12, 13, 14, and 15 are employed and extend outwardly from core 9.

As shown by FIG. 5, the radial cross-pieces may also be entirely eliminated or replaced, for example, by a cylinder. Instead of the radial cross-piece, the possibility exists of equipping the upper triangle side 6 with a recess 20.

Because of the design of the underside of the cover piece and the space A, the possibility exits that supports with greater tolerance ranges (e.g. and different sheet metal thicknesses, as well as different aperture diameters), can be used for mounting of the fastening element according to the invention.

It is apparent from FIGS. 1 and 2 that each wing 4 has in the lower end region of the second triangle side 5 an inclination or chamfer 16. The inclination 16 passes over, adjacent to the core 9, into a cross-piece 17. This provides a simple mounting possibility in form of an insertion aid, inasmuch as the fastening element according to the invention is simply pressed from above into an aperture of the support, and the spirally wound wings 4 become radially deformed until the gap A according to FIG. 3 has been reached and the triangle sides 6 of the wings are located behind the support aperture, whereby troubleproof locking is afforded, independently of the bore tolerances.

For example, a total of six wings 4 can be arranged at the outer circumference of core 9 of the insertion piece 2. The wings can be connected with each other in the upper region via a thin foil.

The cover piece 3 can be equipped with a circumferential sealing lip 11 that is inclined toward the insertion piece 2. Preferably, the sealing lip 11 has an external diameter of such dimension that it, for instance, radially outward beyond the wings 4 as seen in FIG. 4.

The circumferential sealing lip 11 is adjacent to an area of cover piece 3, designed in the shape of a cylinder, which in turn is equipped on the underside with the radial cross-pieces 12, 13, 14, and 15.

According to FIGS. 1 and 3, there exists the possibility that above the cover piece 3, there is arranged a mounting or attachment zone 18, which is not shown in more detail, but could, for example, comprise a wall clamp, an engagement clip, or a differently designed element for attachment of a part in the area of an aperture of a support.

Due to the special design of the spirally wound wings 4, simple installation results. For example, little press-in force is required for insertion of the attachment piece 1 into a support aperture. Moreover, the specially designed wings facilitate a larger tolerance range with respect to sheet metal thickness and diameter of support aperture. In addition, disassembly with ease is possible, since the elastic wings, because of their special shape, can deform themselves in such manner that the fastening element, according to the invention, can, without difficulty, be lifted from the aperture of a support or be unscrewed, for example, through rotating in an upward direction.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a fastening element made of plastic and having an insert portion attachable in an aperture of a support, the insert portion comprising a relatively rigid core having an outer circumference with elastic wings of triangular shape distributed thereabout with a first side of the triangle connected with the core and the opposite outer corner of the triangle defining the outer limits of a second and third side of the triangle and with a cover piece connected to the upper end of the core, the improvement wherein the first triangle sides of the wings extend in spiral wound fashion relative to the core and said first triangle sides are attached to the core in spiral-wound fashion so that the second triangle side of each wing ascends from the core up to the outer corner of the triangle in spirally-wound fashion, and the third triangle side of each wing descends from the core of the insert piece to the outer corner of triangle in spirally-wound fashion.

2. A fastening element according to claim 1 wherein the outer corner of the triangle includes a transition edge which is adjacent to the second triangle side.

3. A fastening element according to claim 1 wherein there is a space between the third triangle side and the underside of the cover piece, which space decreases in thickness towards the core of the insert portion.

4. A fastening element according to claim 3 wherein the cover piece is equipped with a circumferential sealing lip that is inclined downwardly toward the insert portion and the underside of the cover piece has at least two radial cross-pieces extending to the core of the insert portion.

5. A fastening element according to claim 1 wherein each wing has a chamfer on the end of the second triangle side.

6. A fastening element according to claim 5 wherein the chamfer joins with a cross-piece formed adjacent to the core.

7. A fastening element according to claim 1 wherein there are a total of six wings arranged at the outer circumference of the core.

8. A fastening element according to claim 1 wherein the cover piece has a sealing lip that extends radially outward beyond the outer triangle corner of the wings.

9. A fastening element according to claim 1 wherein an attachment zone is located above the cover piece.

10. In a fastening element made of plastic and having an insert portion attachable in an aperture of a support, the insert portion comprising a relatively rigid core having and outer circumference with elastic wings of triangular shape distributed thereabout with one side of the triangle connected with the core and the opposite outer corner of the triangle defining the outer limits of a second and a third side of the triangle and with a cover piece connected to the upper end of the core, the improvement wherein the wings are attached to the core in spiral-wound fashion so that the second triangle side of each wing ascends from the core up to the outer corner of the triangle in spirally-wound fashion, and the third triangle side of each wing descends from the core of the insert piece to the outer corner of triangle in spirally-wound fashion, and further wherein each wing has a chamfer on the end of the second triangle side with the chamfer joining with a cross-piece formed adjacent to the cord.

* * * * *